(No Model.)
J. H. & C. ROSE.
AGRICULTURAL BOILER.
No. 372,044. Patented Oct. 25, 1887.
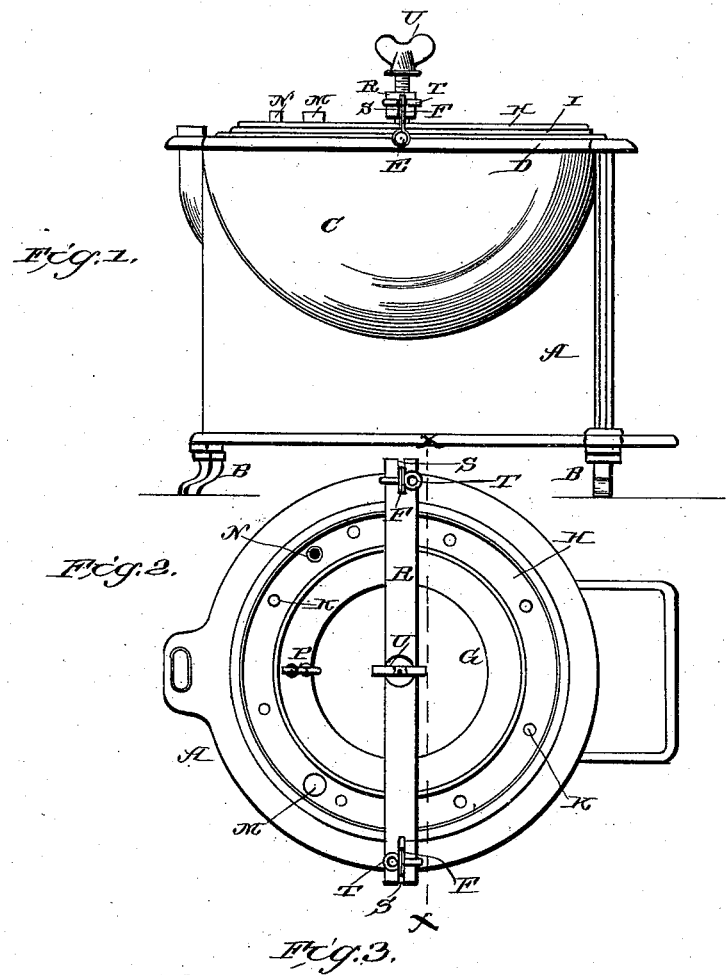
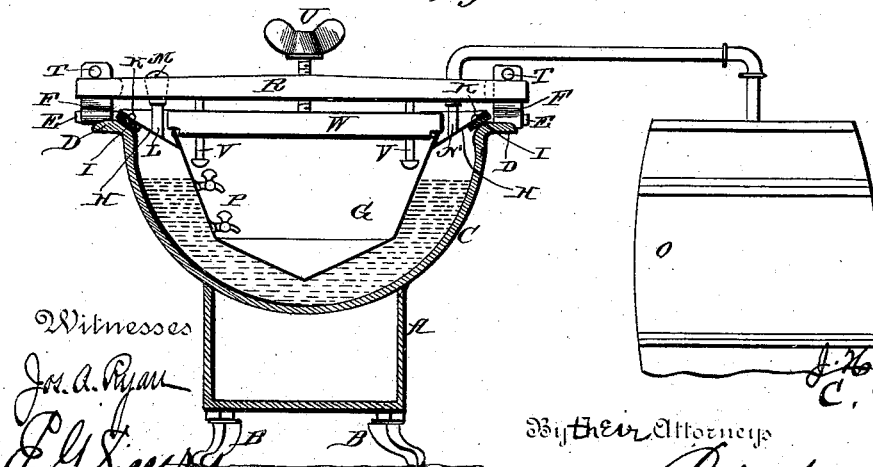

UNITED STATES PATENT OFFICE.

JOHN H. ROSE AND CHRISTIAN ROSE, OF PRAIRIE DU SAC, WISCONSIN, ASSIGNORS OF ONE-THIRD TO MARTIN C. MOORE, OF SAME PLACE.

AGRICULTURAL BOILER.

SPECIFICATION forming part of Letters Patent No. 372,044, dated October 25, 1887.

Application filed May 20, 1887. Serial No. 238,888. (No model.)

*To all whom it may concern:*

Be it known that we, JOHN H. ROSE and CHRISTIAN ROSE, citizens of the United States, residing at Prairie du Sac, in the county of Sauk and State of Wisconsin, have invented a new and useful Improvement in Agricultural Boilers, of which the following is a specification.

Our invention is an improvement in agricultural boilers; and it consists in the peculiar construction and combination of devices, that will be more fully set forth hereinafter, and particularly pointed out in the claim.

In the drawings, Figure 1 is an elevation of an agricultural boiler embodying our improvements. Fig. 2 is a top plan view of the same. Fig. 3 is a vertical transverse sectional view taken on the line $x$ $x$ of Fig. 2, and a barrel in elevation shown in connection therewith.

A represents a furnace of the usual construction, provided with supporting-legs B, and C represents the caldron or kettle, which is supported on the furnace, as shown. This caldron or kettle is provided at its upper edge with an annular flange, D, and at opposite sides of the kettle are horizontal outwardly-projecting spindles E, on which are pivoted ears F.

G represents an interior vessel, which is adapted to fit in the kettle or caldron and to rest in the same at a suitable distance from the sides and bottom thereof. The said vessel G is made of sheet metal, and is provided at its upper edge with an outward and upward extending flared supporting flange, H, which is adapted to extend over and rest upon the flange D. The under side of the flange H is covered by an annular packing-ring, I, which is made of asbestus or other suitable material and is secured to the flange by means of rivets K. It will be observed by reference to Fig. 3 that the packing-ring effects a tight joint between the flange-plate H of the interior vessel and the upper edge of the kettle or caldron.

L represents a short vertical tube which extends through the flange H and projects upward from the same. On the upper end of this tube is placed a weighted cylindrical thimble or cap, M, the function of which will be stated hereinafter.

N represents a steam-pipe which extends through the flange H and communicates with the space between the inner vessel and the kettle, and the said pipe extends outward from the boiler for a suitable distance and has its outer end downturned and extended into a barrel or other receiving-vessel, O.

P represents a pair of faucets with which one side of the interior vessel is provided, the said faucets projecting inwardly from the said vessel and being arranged one above the other, as shown in Fig. 3.

R represents a cross-bar which is provided with open slots S at its ends, adapted to receive the upper ends of the ears F. Pins T extend transversely through openings in the upper ends of the said ears and bear upon the upper side of the said cross-bar, and the latter extends over the kettle and the interior vessel and bears downward upon the flange H of the latter.

U represents a vertical clamping-screw which extends downward through a central opening made in the cross-bar R. From the lower side of the said cross-bar, at suitable distances from the ends thereof, project vertical guide-rods V.

W represents the clamping-bar, which is somewhat shorter than the bar R, and is provided near its ends with vertical openings, through which the guides V are passed. The ends of the said clamping-bar rest upon the upper edges of the main portion of the inner vessel, and by turning the clamping-screw the said bar W may be forced downward on the inner vessel, so as to cause the packing-ring between the same and the outer kettle to be so firmly compressed as to effect a steam-tight joint.

The operation of our invention is as follows: If it be desired to steam feed for horses or cattle, this may be accomplished by placing a suitable quantity of water in the kettle and turning the faucets so that communication between the kettle and the interior vessel is cut off, and placing the feed to be steamed in the interior vessel, and then raising steam in the kettle. When the pressure of the steam becomes sufficiently strong, the cap or sleeve M and the upper end of the tube L will be forced upward, thereby permitting the escape of the steam and preventing an explosion. The pipe which extends from the flange of the inner vessel to the barrel or tank O conveys the steam which is generated in the vessel to the said tank or kettle, and the said steam will be utilized to heat water therein. By turning the faucets boiling water may be admitted from the kettle to the interior vessel when needed.

From the foregoing description it will be readily understood that the interior vessel may be removed from the kettle by first removing the cross-bar R therefrom when it is not desired to steam the feed.

Having thus described our invention, we claim—

In combination with the exterior vessel, C, the interior vessel adapted to be placed in said exterior vessel and provided with the flange H, extending outward from its upper edge, and the faucets P, arranged at different heights in the interior vessel and adapted to admit water thereto from the kettle or caldron, substantially as described.

In testimony that we claim the foregoing as our own we have hereto affixed our signatures in presence of two witnesses.

JOHN H. ROSE.
CHRISTIAN ROSE.

Witnesses:
W. T. KELSEY,
H. E. FISCHER.